United States Patent
Kalb

(10) Patent No.: US 9,005,450 B2
(45) Date of Patent: Apr. 14, 2015

(54) USE OF MAGNETIC, IONIC LIQUIDS AS AN EXTRACTION AGENT

(75) Inventor: Roland Kalb, Leoben (AT)

(73) Assignee: Proionic Production of Ionic Substances GmbH & Co KG (AT)

( * ) Notice: Subject to any disclaimer, the term of this patent is extended or adjusted under 35 U.S.C. 154(b) by 887 days.

(21) Appl. No.: 12/809,234

(22) PCT Filed: Dec. 17, 2008

(86) PCT No.: PCT/EP2008/067731
§ 371 (c)(1),
(2), (4) Date: Oct. 13, 2010

(87) PCT Pub. No.: WO2009/080648
PCT Pub. Date: Jul. 2, 2009

(65) Prior Publication Data
US 2011/0020509 A1   Jan. 27, 2011

Related U.S. Application Data

(60) Provisional application No. 61/015,469, filed on Dec. 20, 2007.

(51) Int. Cl.
| | | |
|---|---|---|
| *B03C 1/015* | (2006.01) | |
| *B01D 11/04* | (2006.01) | |
| *H01F 1/44* | (2006.01) | |
| *B03C 1/033* | (2006.01) | |

(52) U.S. Cl.
CPC ............ *H01F 1/447* (2013.01); *B01D 11/0419* (2013.01); *B01D 11/0492* (2013.01); *B03C 1/015* (2013.01); *B03C 1/033* (2013.01)

(58) Field of Classification Search
CPC .............. B01D 11/04; B01D 11/0419; B01D 11/0492; B01D 11/02; B01D 11/0211; B01D 11/0288; B03C 1/015; B03C 1/033
See application file for complete search history.

(56) References Cited

U.S. PATENT DOCUMENTS

| | | | | |
|---|---|---|---|---|
| 5,043,070 A | * | 8/1991 | Hwang | 210/634 |
| 2005/0010076 A1 | * | 1/2005 | Wasserscheid et al. | 585/862 |
| 2007/0131535 A1 | * | 6/2007 | Shiflett et al. | 203/50 |
| 2007/0193952 A1 | * | 8/2007 | Maase et al. | 210/634 |

FOREIGN PATENT DOCUMENTS

| | | | |
|---|---|---|---|
| EP | WO2005/019137 | * | 3/2005 |
| WO | 2007/094739 | | 8/2007 |

OTHER PUBLICATIONS

Lee et al. Recovery of magnetic ionic liquid [bmim]FeCl4 using electromagnet. Korean J. Chem. Eng., 24(3), 436-437 (2007).*
Saito et al. "Progress in paramagnetic ionic liquids", Feb. 28, 2011, available at <http://www.intechopen.com/books>, accessed Dec. 10, 2012.*
Sigma-Aldrich, "Iron (III) Chloride Hexahydrate, Material Safety Data Sheet", Apr. 25, 2012, available at <http://sigma-aldrich.com>, accessed Dec. 10, 2012.*
Hayashi, et al., "Discovery of a Magnetic Ionic Liquid [bmim] FeCl4," Chemistry Letters, vol. 33(12), pp. 1590-1591 (2004).
Prondzinski, et al., "[(bmpyr)2{Zn(OC6H3(NO2)2)4}]: Influence of an Ionic Liquid on Liquid/Liquid Extraction of Metal Ions in a Biphasic System," Z. Amorg. Allg. Chem., vol. 633, pp. 1490-1492 (2007).
Guerrero-Sanchez, et al., "Magnetorheological Fluids Based on Ionic Liquids," Advanced Materials, vol. 19, pp. 1740-1747 (2007).
Yoshida, et al., "Influence of structural variations in 1-alkyl-3-methylimidazolium cation and tetrahalogenoferrate (III) anion on the physical properties of the paramagnetic ionic liquids," Journal of Materials Chemistry, vol. 16, pp. 1254-1262 (2006).
Freemantle, M., "Eyes on Ionic Liquids," Chemical and Engineering News (Science/Technology), pp. 37-50 (2000).

* cited by examiner

*Primary Examiner* — Katherine Zalasky
(74) *Attorney, Agent, or Firm* — Ostrolenk Faber LLP

(57) ABSTRACT

The invention relates to a method which uses magnetic ionic liquids for the liquid-liquid, liquid-solid, or liquid-gas extraction, wherein the partition of the phases occurs in a magnetic field.

10 Claims, No Drawings

USE OF MAGNETIC, IONIC LIQUIDS AS AN EXTRACTION AGENT

CROSS REFERENCE TO RELATED APPLICATIONS

The present application is a 35 U.S.C. §371 national phase conversion of PCT/EP2008/067731 filed Dec. 17, 2008 and claims priority of U.S. Provisional Patent Application No. 61/015,469 filed Dec. 20, 2007, both incorporated herein in their entirety.

The invention relates to a method of using ionic liquids, more particularly magnetic ionic liquids, for extraction, more particularly for liquid-liquid, liquid-solid or liquid-gas extraction, wherein the separation of the phases takes place in a magnetic field.

FIELD OF INVENTION

Ionic liquids are—within the meaning of the recognized literature (e.g., Wasserscheid, Peter; Welton, Tom (Eds.); "*Ionic Liquids in Synthesis*", Verlag Wiley-VCH 2003; ISBN 3-527-30515-7; Rogers, Robin D.; Seddon, Kenneth R. (Eds.); "*Ionic Liquids—Industrial Applications to Green Chemistry*", ACS Symposium Series 818, 2002; ISBN 0841237891")—liquid organic salts or salt mixtures consisting of organic cations and organic or inorganic anions, with melting points of below 100° C. These salts may additionally contain inorganic salts dissolved therein and also molecular adjuvants. For the purposes of this application, the arbitrary 100° C. limit of the melting point of ionic liquids is viewed more broadly and will accordingly also include molten salts having a melting point above 100° C., but below 200° C. This is because they otherwise do not differ in their properties.

Ionic liquids have extremely interesting properties, for example a very low or almost immeasurable vapor pressure, a very large liquidus region, good electrical conductivity and unusual solvation properties. These properties predestine them for use in various fields of industrial applications. For instance, they can be used as solvents (in organic and inorganic synthesis in general, in transition metal catalysis, biocatalysis, phase transfer catalysis, multiphase reactions, in photochemistry, in polymer synthesis and nanotechnology), as extractants (in liquid-liquid and liquid-gas extraction in general, the desulfurization of crude oil, the removal of heavy metals from wastewaters, liquid membrane extraction), as electrolytes (in batteries, fuel cells, capacitors, solar cells, sensors, in electrochromism, electroplating, in electrochemical metal working, in electrochemical synthesis in general, in electroorganic synthesis, nanotechnology), as lubricants, as heat transfer fluids, as gels, as reagents for organic synthesis, in "green" chemistry (replacement for volatile organic compounds), as antistats, in specialty applications of analysis (gas chromatography, mass spectroscopy, capillary zone electrophoresis), as liquid crystals, etc. (enumeration not complete). In this regard, reference may be made for example to "Rogers, Robin D.; Seddon, Kenneth R. (Eds.); Ionic Liquids—Industrial Applications to Green Chemistry, ACS Symposium Series 818, 2002; ISBN 0841237891" and "Wasserscheid, Peter; Welton, Tom (Eds.); Ionic Liquids in Synthesis, Verlag Wiley-VCH 2003; ISBN 3527305157".

SUMMARY OF INVENTION

It may be an object of the present invention to provide liquid extracting media which regardless of the action of the gravitational force and/or the centrifugal force and regardless of the density difference between the two phases can be separated and which may also be widely adaptable in their chemical and physical properties to any given separation problem.

We have found that this object is achieved by the use of an ionic liquid, a device for extracting, a process for extracting and an extracting medium as per the independent claims. Further exemplary embodiments are described in the dependent claims.

In accordance with an exemplary aspect there is provided the use of an ionic liquid as an extracting medium for an extraction, wherein the extraction is carried out on the basis of an interaction between the extracting medium and a magnetic field. More particularly, the ionic liquid may have a melting point of below 200° C. The melting point of the ionic liquid is preferably below 100° C. and more preferably below 20° C.

In accordance with an exemplary aspect there is provided a process for extracting a component from a feed, which process comprises generating an extract of the component and of an extracting medium by contacting the feed with the extracting medium comprising an ionic liquid, and separating the extract off by means of a magnetic field.

In accordance with an exemplary aspect there is provided a device for extracting a component from a feed, which device comprises an extracting medium for extracting a component from a feed, wherein the extracting medium comprises an ionic liquid, and a unit for generating a magnetic field for separating off an extract. More particularly, the ionic liquid may be a paramagnetic liquid.

In accordance with an exemplary aspect there is provided an extracting medium for extracting a component from a feed, wherein the extracting medium comprises a paramagnetic ionic liquid.

Embodiments of the use of an extracting medium will now be described. The features of the embodiments, however, also hold for the process for extracting, the device for extracting and the extractant.

In an exemplary embodiment, the ionic liquid is a paramagnetic ionic liquid.

A paramagnetic ionic liquid may more particularly be understood as meaning an ionic liquid that additionally has the property of, on application of an external, inhomogeneous magnetic field, experiencing a force which pulls it into the magnetic field, and so it accordingly has a magnetic susceptibility >1.

In relation to such a use of ionic liquids, the optimization of the properties to the particular extractive use may be effected within wide limits by the structure of anion and cation and/or their combination being varied, which incidentally has earned ionic liquids very generally the tag "designer solvents" (see for example Freemantle, M.; Chem. Eng. News, 78, 2000, 37).

In an exemplary embodiment, the extraction is a liquid-liquid or liquid-solid or liquid-gas extraction.

In an exemplary embodiment, the paramagnetic ionic liquid comprises an anion comprising a transition metal compound.

In an exemplary embodiment, the paramagnetic ionic liquid comprises a cation comprising a transition metal and/or a transition metal compound.

For completeness, it may be noted here that, according to IUPAC Rule 1.21, transition metals are more particularly the elements of atomic numbers 21-30, 39-48, 57-80, 89-103, 104 up to the hypothetical 112.

In an exemplary embodiment, the paramagnetic ionic liquid conforms to one of the general formulae $[A]^+[M^{+\nu}X_{\nu+1}]^-$, $([A]^+)_2[M^{+\nu}X_{\nu+2}]^{2-}$ or $([A]^+)_3[M^{+\nu}X_{\nu+3}]^{3-}$ where $[A]^+$ is a quaternary ammonium cation [R$^{1'}$R$^1$R$^2$R$^3$N]$^+$, a phosphonium cation [R$^{1'}$R$^1$R$^2$R$^3$P]$^+$, a sulfonium cation [R$^{1'}$R$^1$R$^2$S]$^+$ or a heteroaromatic cation, wherein M$^{+v}$ is a transition metal atom having the oxidation number +v and wherein X is an ion or ligand having the charge number −1. R$^{1'}$, R$^1$, R$^2$ and R$^3$ may here be radicals as will be more particularly described hereinbelow.

In an exemplary embodiment, the paramagnetic ionic liquid comprises a solution of a paramagnetic inorganic and/or organic salt in a nonparamagnetic ionic liquid. That is, the paramagnetic ionic liquid may be generated by a paramagnetic inorganic or paramagnetic organic salt being dissolved in an inherently nonparamagnetic ionic liquid or mixed therewith.

In an exemplary embodiment, the nonparamagnetic ionic liquid conforms to the general formula ([A]$^+$)$_a$[B]$^{a-}$, where [A]$^+$ is a quaternary ammonium cation [R$^{1'}$R$^1$R$^2$R$^3$N]$^+$, a phosphonium cation [R$^{1'}$R$^1$R$^2$R$^3$P]$^+$, a sulfonium cation [R$^{1'}$R$^1$R$^2$S]$^+$ or a heteroaromatic cation. R$^{1'}$, R$^1$, R$^2$ and R$^3$ may here be radicals as will be more particularly described hereinbelow.

In an exemplary embodiment, the paramagnetic salt has a melting point of below 200° C. More particularly, the paramagnetic salt may have a melting point of below 100° C. and preferably of below 20° C.

In an exemplary embodiment, the paramagnetic ionic liquid comprises a solution of a paramagnetic inorganic and/or paramagnetic organic salt in an ionic liquid and the paramagnetic ionic liquid has a melting point of below 200° C. More particularly, the paramagnetic liquid may have a melting point of below 100° C. and preferably of below 20° C. That is, the paramagnetic ionic liquid which is then used as an extracting medium may be generated by a paramagnetic inorganic or paramagnetic organic salt being dissolved in an inherently nonparamagnetic ionic liquid or in an already paramagnetic liquid or mixed therewith.

Paramagnetic salts may be more particularly salts (and their solutions in molecular solvents) which are pulled into an inhomogeneous external magnetic field. Examples thereof may be, for instance, FeCl$_3$ and many compounds of the rare earths and of the actinides. Common to them is the existence of lone electrons, for example in "high spin" complexes.

As examples of magnetic liquids there may be mentioned so-called ferrofluids which are not genuine liquids but suspensions of down to nano-finely ground ferrite particles, i.e., ferrite particles (solid materials) which have been ground down to a size ranging from a few micrometers to a few nanometers, in diverse solvents. They have a strong response to external magnetic fields.

A published example of a magnetic ionic liquid is 1-butyl-3-methylimidazolium tetrachloroferrate (III) (Hayashi, Satoshi; Hamaguchi, Hiro-o. Chemistry Letters (2004), 33(12), 1590-1591). This substance has a comparatively large magnetic susceptibility of χ=40 10$^{-6}$ emu/g (electro magnetic units), and is paramagnetic.

In accordance with an exemplary aspect, paramagnetic ionic liquids are used as extracting media for liquid-liquid or liquid-solid or liquid-gas extraction and separated off in a magnetic field.

It is to be noted that embodiments of the invention have been, and will be hereinbelow, described with reference to different invention subjects. More particularly, some embodiments of the invention are described with device claims and other embodiments of the invention with process claims and use claims. However, a person skilled in the art will immediately become aware on reading this application that, unless explicitly stated otherwise, any desired combination of features belonging to different types of invention subject is possible as well as a combination of features belonging to one type of invention subject.

The fundamental prerequisite for a paramagnetic interaction with a magnetic field is the presence of atoms, molecules or ions having "lone" electrons. The possibilities are in principle a.) free radicals b.) or chemical compounds of the transition metals (according to IUPAC Rule 1.21 elements of atomic numbers 21-30, 39-48, 57-80, 89-103, 104 up to the hypothetical 112).

Exemplary embodiments of paramagnetic ionic liquids have the following structural features:

a. a transition metal compound as anion, b. or a transition metal or transition metal compound as cation, c. or a solution of a paramagnetic inorganic or organic salt in an ionic liquid having the structural features a. and/or b. or in a nonparamagnetic ionic liquid, it being immaterial whether the paramagnetic salt does or does not react with the ionic liquid, d. or any desired mixture of ionic liquids having the structural features a.-c., wherein the nonparamagnetic ionic liquid in c. conforms to the general formula I

$$([A]^+)_a[B]^{a-} \quad \quad (I),$$

where [A]$^+$ is a quaternary ammonium cation [R$^{1'}$R$^1$R$^2$R$^3$N]$^+$, a phosphonium cation [R$^{1'}$R$^1$R$^2$R$^3$P]$^+$ a sulfonium cation [R$^{1'}$R$^1$R$^2$S]$^+$ or a heteroaromatic cation, R$^1$, R$^{1'}$, R$^2$, R$^3$ are each independently hydrogen, optionally substituted alkyl, alkenyl, alkynyl, cycloalkyl, cycloalkenyl, aryl or heteroaryl;

or two of R$^1$, R$^{1'}$, R$^2$, R$^3$ combine with the heteroatom to which they are attached to form a ring, wherein this ring is saturated or unsaturated, substituted or unsubstituted and wherein this chain can be interrupted by one or more heteroatoms selected from the group consisting of O, S, NH and N—C$_1$-C$_4$-alkyl, and

[B]$^{a-}$ can be any desired anion having the negative charge a.

The heteroaromatic of the formula is typically a 5- or 6-membered heteroaromatic which contains at least one nitrogen atom and also, optionally, an oxygen or sulfur atom, and which is substituted or unsubstituted and/or is fused; preferably the heteroaromatic of the formula IIb is selected from the group consisting of:

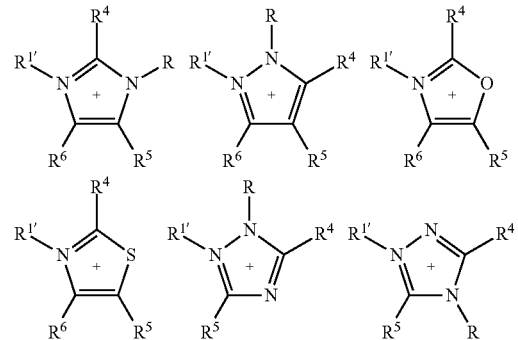

-continued

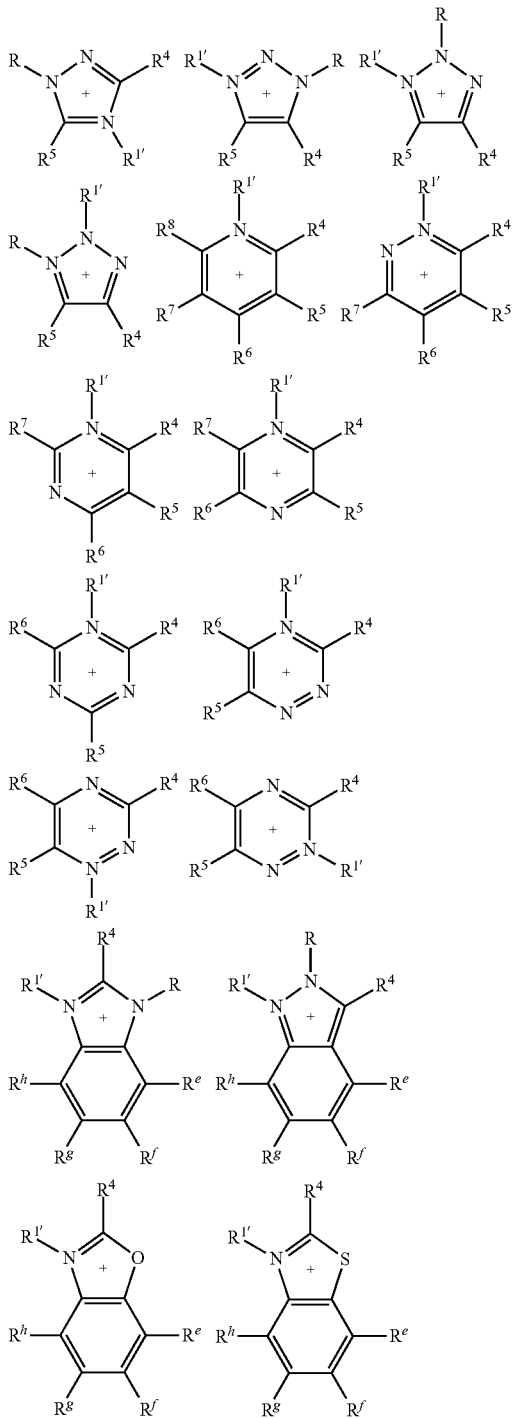

where

R is hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkynyl, aryl or heteroaryl, wherein the last 7 radicals mentioned can bear one or more halogen radicals and/or from 1 to 3 radicals selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, $CO-NR^cR^d$, where $R^c$ and $R^d$ are each hydrogen, $C_1$-$C_6$-alkyl, $C_1$-$C_6$-haloalkyl, cyclopentyl, cyclohexyl, phenyl, tolyl or benzyl;

$R^1$, $R^{1'}$, $R^2$, $R^3$ are each independently hydrogen, optionally substituted alkyl, alkenyl, alkynyl, cycloalkyl, cycloalkenyl, aryl or heteroaryl;

or two of $R^1$, $R^{1'}$, $R^2$, $R^3$ combine with the heteroatom to which they are attached to form a ring, wherein this ring is saturated or unsaturated, substituted or unsubstituted and wherein this chain can be interrupted by one or more heteroatoms selected from the group consisting of O, S, NH and N—$C_1$-$C_4$-alkyl;

$R^4$, $R^5$, $R^6$, $R^7$, $R^8$ are each independently hydrogen, halogen, nitro, cyano, $OR^c$, $SR^c$, $NR^cR^d$, $COR^c$, $COOR^c$, $CO-NR^c$ $R^d$, $C_1$-$C_{30}$-alkyl, $C_3$-$C_{12}$-cycloalkyl, $C_2$-$C_{30}$-alkenyl, $C_3$-$C_{12}$-cycloalkenyl, aryl or heteroaryl, wherein the last 6 radicals mentioned may bear one or more halogen radicals and/or from 1 to 3 radicals selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, $CO-NR^cR^d$, where $R^c$ and $R^d$ are each independently hydrogen, $C_1$-$C_6$-alkyl, $C_1$-$C_6$-haloalkyl, cyclopentyl, cyclohexyl, phenyl, tolyl or benzyl; or two of R, $R^4$, $R^5$, $R^6$, $R^7$, $R^8$, which are adjacent, combine with the atom to which they are attached to form a ring, wherein this ring is unsaturated or aromatic, substituted or unsubstituted and wherein the chain formed by the radicals in question can be interrupted by one or more heteroatoms selected from the group consisting of O, S, N, NH and N—$C_1$-$C_4$-alkyl, $R^e$, $R^f$, $R^g$, $R^h$ are each independently hydrogen, $C_1$-$C_6$-alkyl, aryl, heteroaryl, $C_3$-$C_7$-cycloalkyl, halogen, $OR^c$, $SR^c$, $NR^cR^d$, $COOR^c$, $CO-NR^cR^d$ or $COR^6$, where $R^c$ and $R^d$ are each independently hydrogen, $C_1$-$C_6$-alkyl, $C_1$-$C_6$-haloalkyl, cyclopentyl, cyclohexyl, phenyl, tolyl or benzyl; preferably hydrogen, halogen or $C_1$-$C_6$-alkyl, more particularly hydrogen or $C_1$-$C_6$-alkyl;

$[B]^{a-}$ is preferably fluoride, chloride, bromide, iodide; hexafluorophosphate; hexafluoroarsenate; hexafluoro antimonate; trifluoroarsenate; nitrite; nitrate; sulfate; hydrogensulfate; carbonate; hydrogencarbonate; alkylcarbonate; arylcarbonate; phosphate; hydrogenphosphate; dihydrogenphosphate; tetra-substituted borate of the general formula (Va) $[BR^iR^jR^kR^l]^-$, where $R^i$ to $R^l$ are each independently fluorine or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfonate of the general formula (Vb) $[R^m-SO_3]^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfate of the general formula (Vc) $[R^m-OSO_3]^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

carboxylate of the general formula (Vd) $[R^n-COO]^-$, where $R^n$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

(fluoroalkyl)fluorophosphate of the general formula (Ve) $[PF_x(C_yF_{2y+1-z}H_z)_{6-x}]^-$, where $1\leq x\leq 6$, $1\leq y\leq 8$ and $0\leq z\leq 2y+1$; or imide of the general formulae (Vf) $[R^o-SO_2-N-SO_2-R^p]^-$, (Vg) $[R^r-SO_2-N-CO-R^s]^-$ or (Vh) $[R^t-CO-N-CO-R^u]^-$, where $R^o$ to $R^u$ are each independently hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen.

Organic phosphate of the general formula (Vi) $[R^m-OPO_4]^{2-}$ or (Vj) $[R^m-OPO_2-OR'']^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen, and where $R''$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen.

The charge "a–" of the anion $[B]^{a-}$ is "1–", "2–" or "3–". Sulfate, hydrogenphosphate and carbonate may be mentioned as examples of doubly negatively charged anions. Phosphate may be mentioned as an example of a triply negatively charged anion.

When having the meaning of a carbon-containing organic, saturated or unsaturated, acyclic or cyclic, aliphatic, aromatic or araliphatic radical of from 1 to 30 carbon atoms, the radicals $R^i$ to $R^l$ in the tetra-substituted borate (Va), the radical $R^m$ in the organic sulfonate (Vb) and sulfate (Vc), the radical $R''$ in the carboxylate (Vd) and the radicals $R^o$ to $R^u$ in the imides (Vf), (Vg) and (Vh) preferably are each independently $C_1$- to $C_{30}$-alkyl and their aryl-, heteroaryl-, cycloalkyl-, halogen-, hydroxyl-, amino-, carboxyl-, formyl-, —O—, —CO—, —CO—O— or —CO—N-substituted components, for example methyl, ethyl, 1-propyl, 2-propyl, 1-butyl, 2-butyl, 2-methyl-1-propyl(isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl(benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ where $n\leq 30$, $0\leq a\leq n$ and $b=0$ or 1 (for example $CF_3$, $C_2F_5$, $CH_2CH_2-C_{(n-2)}F_{2(n-2)+1}$, $C_6F_{13}$, $C_8F_{17}$, $C_{10}F_{21}$, $C_{12}F_{25}$);

$C_3$- to $C_{12}$-cycloalkyl and their aryl-, heteroaryl-, cycloalkyl-, halogen-, hydroxyl-, amino-, carboxyl-, formyl-, —O—, —CO— or —CO—O-substituted components, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_{nF2(n-a)-(1-b)}H_{2a-b}$ where $n\leq 30$, $0\leq a\leq n$ and $b=0$ or 1;

$C_2$- to $C_{30}$-alkenyl and their aryl-, heteroaryl-, cycloalkyl-, halogen-, hydroxyl-, amino-, carboxyl-, formyl-, —O—, —CO— or —CO—O-substituted components, for example 2-propenyl, 3-butenyl, cis-2-butenyl, trans-2-butenyl or $C_{nF2(n-a)-(1-b)}H_{2a-b}$ where $n\leq 30$, $0\leq a\leq n$ and $b=0$ or 1;

$C_3$- to $C_{12}$-cycloalkenyl and their aryl-, heteroaryl-, cycloalkyl-, halogen-, hydroxyl-, amino-, carboxyl-, formyl-, —O—, —CO— or —CO—O-substituted components, for example 3-cyclopentenyl, 2-cyclohexenyl, 3-cyclohexenyl, 2,5-cyclohexadienyl or $C_{nF2(n-a)-3(1-b)}H_{2a-3b}$ where $n\leq 30$, $0\leq a\leq n$ and $b=0$ or 1; and aryl or heteroaryl having from 2 to 30 carbon atoms and their alkyl-, aryl-, heteroaryl-, cycloalkyl-, halogen-, hydroxyl-, amino-, carboxyl-, formyl-, —O—, —CO— or —CO—O-substituted components, for example phenyl, 2-methylphenyl (2-tolyl), 3-methylphenyl(3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_{6F(5-a)}H_a$ where $0\leq a\leq 5$.

When the anion $[B]^{a-}$ comprises a tetra-substituted borate (Va) $[BR^iR^jR^kR^l]^-$, all the four radicals $R^i$ to $R^l$ are preferably identical therein, these radicals each preferably being fluorine, trifluoromethyl, pentafluoroethyl, phenyl, 3,5-bis(trifluoromethyl)phenyl. Particularly preferred tetra-substituted borates (Va) are tetrafluoroborate, tetraphenylborate and tetra [3,5-bis(trifluoromethyl)phenyl]borate.

When the anion $[B]^{a-}$ comprises an organic sulfonate (Vb) $[R^m-SO_3]^-$ or sulfate (Vc) $[R^m-OSO_3]^-$, the radical $R^m$ is preferably methyl, trifluoromethyl, pentafluoroethyl, p-tolyl or $C_9F_{19}$. Particularly preferred organic sulfonates (Vb) are trifluoromethanesulfonate (triflate), methanesulfonate, nonadecafluorononanesulfonate (nonaflate) and p-toluenesulfonate; particularly preferred organic sulfates (Vc) are methylsulfate, ethylsulfate, n-propylsulfate, i-propylsulfate, butylsulfate, pentylsulfate, hexylsulfate, heptylsulfate, octylsulfate, nonylsulfate and decylsulfate and also longer-chained n-alkylsulfates; benzylsulfate, alkylarylsulfate.

When the anion $[B]^{a-}$ comprises a carboxylate (Vd) $[R''-COO]^-$, the radical $R''$ is preferably hydrogen, trifluoromethyl, pentafluoroethyl, phenyl, hydroxyphenylmethyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl (isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred carboxylates (Vc) are formate, acetate, propionate, butyrate, valerate, benzoate, mandelate, trichloroacetate, dichloroacetate, chloroacetate, trifluoroacetate, difluoroacetate, fluoroacetate.

When the anion $[B]^{a-}$ comprises a (fluoroalkyl)fluorophosphate (Ve) $[PF_x(C_yF_{2y+1-z}H_z)_{6-x}]^-$, z is preferably 0. Particular preference is given to (fluoroalkyl)fluorophosphates (Ve) where $z=0$, $x=3$ and $1\leq y\leq 4$, specifically $[PF_3(CF_3)_3]^-$, $[PF_3(C_2F_5)_3]^-$, $[PF_3(C_3F_7)_3]^-$ and $[PF_3(C_4F_7)_3]^-$.

When the anion $[B]^{a-}$ comprises an imide (Vf) $[R^o-SO_2-N-SO_2-R^p]^-$, (Vg) $[R^r-SO_2-N-CO-R^s]^-$ or (Vh) [R$^t$—CO—N—CO—R$^u$]$^-$, the radicals R$^o$ to R$^u$ are preferably each independently hydrogen, trifluoromethyl, pentafluoroethyl, phenyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred imides (Vf), (Vg) and (Vh) are [F$_3$C—SO$_2$—N—SO$_2$—CF$_3$]$^-$, [F$_3$C—SO$_2$—N—CO—CF$_3$]$^-$, [F$_3$C—CO—N—CO—CF$_3$]$^-$ and those in which the radicals R$^o$ to R$^u$ are each independently hydrogen, methyl, ethyl, propyl, butyl, phenyl, trichloromethyl, dichloromethyl, chloromethyl, trifluoromethyl, difluoromethyl or fluoromethyl.

wherein the paramagnetic inorganic or organic salt is preferably selected from

CeS, CeCl$_3$, CeF$_3$, Ce$_2$S$_3$, CeO$_2$, CsO$_2$, CrCl$_2$, CrCl$_3$, CrF$_3$, Cr$_2$O$_3$, Cr$_2$(SO$_4$)$_3$, CrO$_3$, CoBr$_2$, CoCl$_2$, CoCl$_2$.6H$_2$O, Co(CN)$_2$, CoF$_2$, CoI$_2$, CoSO$_4$, CoS, CO$_3$O$_4$, CoF$_3$, CO$_2$O$_3$, CuBr$_2$, CuCl$_2$, CuCl$_2$.2H$_2$O, CuF$_2$, CuF$_2$.2H$_2$O, Cu(OH)$_2$, Cu(NO$_3$)$_2$.3H$_2$O, Cu(NO$_3$)$_2$.6H$_2$O, CuO, CuSO$_4$, CuSO$_4$.5H$_2$O, Dy$_2$O$_3$, Dy$_2$S$_3$, Er$_2$O$_3$, Er$_2$(SO$_4$)$_3$.8H$_2$O, Er$_2$S$_3$, EuBr$_2$, EuCl$_2$, EuF$_2$, EuI$_2$, EuS, Eu$_2$O$_3$, Eu$_2$(SO$_4$)$_3$, GdCl$_3$, Gd$_2$O$_3$, Gd$_2$(SO$_4$)$_3$.8H$_2$O, Gd$_2$S$_3$, Ho$_2$O$_3$, IrO$_2$, FeBr$_2$, FeCO$_3$, FeCl$_2$, FeCl$_2$.4H$_2$O, FeF$_2$, FeI$_2$, FeO, FeSO$_4$, FeSO$_4$.H$_2$O, FeSO$_4$.7H$_2$O, FeS, FeCl$_3$, FeCl$_3$.6H$_2$O, FeF$_3$, FeF$_3$.3H$_2$O, Fe(NO$_3$)$_3$.9H$_2$O, MnBr$_2$, MnCO$_3$, MnCl$_2$, MnCl$_2$.4H$_2$O, MnF$_2$, Mn(OH)$_2$, MnI$_2$, MnO, MnSO$_4$, MnSO$_4$.H$_2$O, MnSO$_4$.4H$_2$O, MnS($\alpha$), MnS(b), Mn$_3$O$_4$, MnF$_3$, Mn$_2$O$_3$, MnO$_2$, MoBr$_3$, MoCl$_3$, MoBr$_4$, MoCl$_4$, MoO$_2$, MoCl$_5$, NdF$_3$, Nd$_2$O$_3$, Nd$_2$(SO$_4$)$_3$, Nd$_2$S$_3$, NiBr$_2$, NiCl$_2$, NiCl$_2$.6H$_2$O, NiF$_2$, Ni(OH)$_2$, Ni(NO$_3$)$_2$.6H$_2$O, NiO, NiSO$_4$, NiS, Ni$_3$S$_2$, PtF$_4$, PuF$_4$, PuO$_2$, PuF$_6$, K$_3$Fe(CN)$_6$, KO$_2$, Pr$_2$O$_3$, Pr$_2$S$_3$, ReO$_2$, ReS$_2$, ReCl$_5$, ReO$_3$, Rh$_2$O$_3$, RbO$_2$, RuCl$_3$, RuCl$_2$, SmBr$_2$, SmBr$_3$, Sm$_2$O$_3$, Sm$_2$(SO$_4$)$_3$.8H$_2$O, Sm$_2$S$_3$, Na$_2$Cr$_2$O$_7$, TaCl$_5$, Tb$_2$O$_3$, Tm$_2$O$_3$, TiBr$_2$, TiCl$_2$, TiI$_2$, TiS, TiBr$_3$, TiCl$_3$, TiF$_3$, Ti$_2$O$_3$, WS$_2$, WBr$_5$, WCl$_5$, UBr$_3$, UCl$_3$, UH$_3$, UI$_3$, UBr$_4$, UCl$_4$, UF$_4$, UO$_2$, UF$_6$, UO$_3$, VBr$_2$, VCl$_2$, VBr$_3$, VCl$_3$, VF$_3$, V$_2$O$_3$, V$_2$S$_3$, VCl$_4$, VO$_2$, V$_2$O$_5$, V$_2$O$_3$, Y$_2$S$_3$ or from an inorganic or organic transition metal salt with analogous cations and the anion [B]$^{a-}$, which is preferably selected from hexafluorophosphate; hexafluoroarsenate; hexafluoroantimonate; trifluoroarsenate; nitrite; nitrate; sulfate; hydrogensulfate; carbonate; hydrogencarbonate; alkylcarbonate; arylcarbonate; phosphate; hydrogenphosphate; dihydrogenphosphate; tetra-substituted borate of the general formula (Va) [BR$^i$R$^j$R$^k$R$^l$]$^-$, where R$^i$ to R$^l$ are each independently fluorine or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfonate of the general formula (Vb) [R$^m$—SO$_3$]$^-$, where R$^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfate of the general formula (Vc) [R$^m$—OSO$_3$]$^-$, where R$^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

carboxylate of the general formula (Vd) [R$^n$—COO]$^-$, where R$^n$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

(fluoroalkyl)fluorophosphate of the general formula (Ve) [PF$_x$(C$_y$F$_{2y+1-z}$H$_z$)$_{6-x}$]$^-$, where $1 \leq x \leq 6$, $1 \leq y \leq 8$ and $0 \leq z \leq 2y+1$; or imide of the general formulae (Vf) [R$^o$—SO$_2$—N—SO$_2$—R$^p$]$^-$, (Vg) [R$^r$—SO$_2$—N—CO—R$^s$]$^-$ or (Vh) [R$^t$—CO—N—CO—R$^u$]$^-$, where R$^o$ to R$^u$ are each independently hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen.

Organic phosphate of the general formula (Vi) [R$^m$—OPO$_4$]$^{2-}$ or (Vj) [R$^m$—OPO$_2$—OR$^n$]$^-$, where R$^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen, and where R$^n$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen.

The charge "a−" of the anion [B]$^{a-}$ is "1−", "2−" or "3−". Sulfate, hydrogenphosphate and carbonate may be mentioned as examples of doubly negatively charged anions. Phosphate may be mentioned as an example of a triply negatively charged anion.

When having the meaning of a carbon-containing organic, saturated or unsaturated, acyclic or cyclic, aliphatic, aromatic or araliphatic radical of from 1 to 30 carbon atoms, the radicals R$^i$ to R$^l$ in the tetra-substituted borate (Va), the radical R$^m$ in the organic sulfonate (Vb) and sulfate (Vc), the radical R$^n$ in the carboxylate (Vd) and the radicals R$^o$ to R$^u$ in the imides (Vf), (Vg) and (Vh) preferably are each independently $C_1$- to $C_{30}$-alkyl and their aryl-, heteroaryl-, cycloalkyl-, halogen-, hydroxyl-, amino-, carboxyl-, formyl-, —O—, —CO—, —CO—O— or —CO—N-substituted components, for example methyl, ethyl, 1-propyl, 2-propyl, 1-butyl, 2-butyl, 2-methyl-1-propyl(isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl(benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_n F_{2(n-a)+(1-b)}H_{2a+b}$ where $n \leq 30$, $0 \leq a \leq n$ and $b=0$ or 1 (for example $CF_3$, $C_2F_5$, $CH_2CH_2-C_{(n-2)}F_{2(n-2)+1}$, $C_6F_{13}$, $C_8F_{17}$, $C_{10}F_{21}$, $C_{12}F_{25}$);

$C_3$- to $C_{12}$-cycloalkyl and their aryl-, heteroaryl-, cycloalkyl-, halogen-, hydroxyl-, amino-, carboxyl-, formyl-, —O—, —CO— or —CO—O-substituted components, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_{nF2(n-a)-(1-b)}H_{2a-b}$ where $n \leq 30$, $0 \leq a \leq n$ and $b=0$ or 1;

$C_2$- to $C_{30}$-alkenyl and their aryl-, heteroaryl-, cycloalkyl-, halogen-, hydroxyl-, amino-, carboxyl-, formyl-, —O—, —CO— or —CO—O-substituted components, for example 2-propenyl, 3-butenyl, cis-2-butenyl, trans-2-butenyl or $C_{nF2(n-a)-(1-b)}H_{2a-b}$ where $n \leq 30$, $0 \leq a \leq n$ and $b=0$ or 1;

$C_3$- to $C_{12}$-cycloalkenyl and their aryl-, heteroaryl-, cycloalkyl-, halogen-, hydroxyl-, amino-, carboxyl-, formyl-, —O—, —CO— or —CO—O-substituted components, for example 3-cyclopentenyl, 2-cyclohexenyl, 3-cyclohexenyl, 2,5-cyclohexadienyl or $C_{nF2(n-a)-3(1-b)}H_{2a-3b}$ where $n \leq 30$, $0 \leq a \leq n$ and $b=0$ or 1; and aryl or heteroaryl having from 2 to 30 carbon atoms and their alkyl-, aryl-, heteroaryl-, cycloalkyl-, halogen-, hydroxyl-, amino-, carboxyl-, formyl-, —O—, —CO— or —CO—O-substituted components, for example phenyl, 2-methylphenyl (2-tolyl), 3-methylphenyl(3-tolyl), 4-methylphenyl, 2-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ where $0 \leq a \leq 5$.

When the anion $[B]^{a-}$ comprises a tetra-substituted borate (Va) $[BR^iR^jR^kR^l]^-$, all the four radicals $R^i$ to $R^l$ are preferably identical therein, these radicals each preferably being fluorine, trifluoromethyl, pentafluoroethyl, phenyl, 3,5-bis(trifluoromethyl)phenyl. Particularly preferred tetra-substituted borates (Va) are tetrafluoroborate, tetraphenylborate and tetra[3,5-bis(trifluoromethyl)phenyl]borate.

When the anion $[B]^{a-}$ comprises an organic sulfonate (Vb) $[R^m-SO_3]^-$ or sulfate (Vc) $[R^m-OSO_3]^-$, the radical $R^m$ is preferably methyl, trifluoromethyl, pentafluoroethyl, p-tolyl or $C_9F_{19}$. Particularly preferred organic sulfonates (Vb) are trifluoromethanesulfonate (triflate), methanesulfonate, nonadecafluorononanesulfonate (nonaflate) and p-toluenesulfonate; particularly preferred organic sulfates (Vc) are methylsulfate, ethylsulfate, n-propylsulfate, i-propylsulfate, butylsulfate, pentylsulfate, hexylsulfate, heptylsulfate, octylsulfate, nonylsulfate and decylsulfate and also longer-chained n-alkylsulfates; benzylsulfate, alkylarylsulfate.

When the anion $[B]^{a-}$ comprises a carboxylate (Vd) $[R^n-COO]^-$, the radical $R^n$ is preferably hydrogen, trifluoromethyl, pentafluoroethyl, phenyl, hydroxyphenylmethyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl (isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred carboxylates (Vc) are formate, acetate, propionate, butyrate, valerate, benzoate, mandelate, trichloroacetate, dichloroacetate, chloroacetate, trifluoroacetate, difluoroacetate, fluoroacetate.

When the anion $[B]^{a-}$ comprises a (fluoroalkyl)fluorophosphate (Ve) $[PF_x(C_yF_{2y+1-z}H_z)_{6-x}]^-$, z is preferably 0. Particular preference is given to (fluoroalkyl)fluorophosphates (Ve) where $z=0$, $x=3$ and $1 \leq y \leq 4$, specifically $[PF_3(CF_3)_3]^-$, $[PF_3(C_2F_5)_3]^-$, $[PF_3(C_3F_7)_3]^-$ and $[PF_3(C_4F_7)_3]^-$.

When the anion $[B]^{a-}$ comprises an imide (Vf) $[R^o-SO_2-N-SO_2-R^p]^-$, (Vg) $[R^r-SO_2-N-CO-R^s]^-$ or (Vh) $[R^t-CO-N-CO-R^u]^-$, the radicals $R^o$ to $R^u$ are preferably each independently hydrogen, trifluoromethyl, pentafluoroethyl, phenyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred imides (Vf), (Vg) and (Vh) are $[F_3C-SO_2-N-SO_2-CF_3]^-$, $[F_3C-SO_2-N-CO-CF_3]^-$, $[F_3C-CO-N-CO-CF_3]^-$ and those in which the radicals $R^o$ to $R^u$ are each independently hydrogen, methyl, ethyl, propyl, butyl, phenyl, trichloromethyl, dichloromethyl, chloromethyl, trifluoromethyl, difluoromethyl or fluoromethyl, or an inorganic or organic complex transition metal salt with central atoms analogous to the cations and anions $[B]^{a-}$ or $F^-$, $Cl^-$, $Br^-$, $I^-$, $CN^-$, $SCN^-$ cyclopentadienyl$^-$, aromatics, chelating agents or other anions or molecules as ligands, or a mixture of all the heretofore described transition metal salts, it being immaterial whether the transition metal salt such as, for example, in

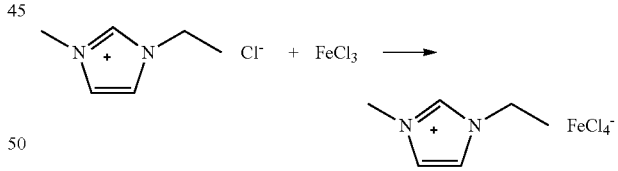

reacts to form a complex, or as, for example, in

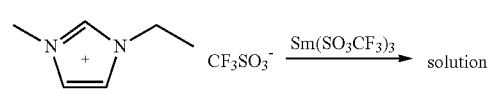

only physically dissolves, wherein the paramagnetic ionic liquid in a. conforms to the general formulae

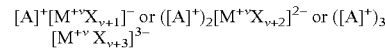

where $[A]^+$ is a quaternary ammonium cation $[R^1R^1R^2R^3N]^+$, a phosphonium cation

[R¹'R¹R²R³P]⁺, a sulfonium cation [R¹'R¹R²S]⁺ or a heteroaromatic cation, R¹, R¹', R², R³ are each independently hydrogen, optionally substituted alkyl, alkenyl, alkynyl, cycloalkyl, cycloalkenyl, aryl or heteroaryl;

or two of R¹, R¹', R², R³ combine with the heteroatom to which they are attached to form a ring, wherein this ring is saturated or unsaturated, substituted or unsubstituted and wherein this chain can be interrupted by one or more heteroatoms selected from the group consisting of O, S, NH and N—$C_1$-$C_4$-alkyl, and $M^{+v}$ is a transition metal atom having the oxidation number +v and X is an ion or ligand having the charge number −1.

The heteroaromatic of the formula is typically a 5- or 6-membered heteroaromatic which contains at least one nitrogen atom and also, optionally, an oxygen or sulfur atom, and which is substituted or unsubstituted and/or is fused; preferably the heteroaromatic is selected from the group consisting of:

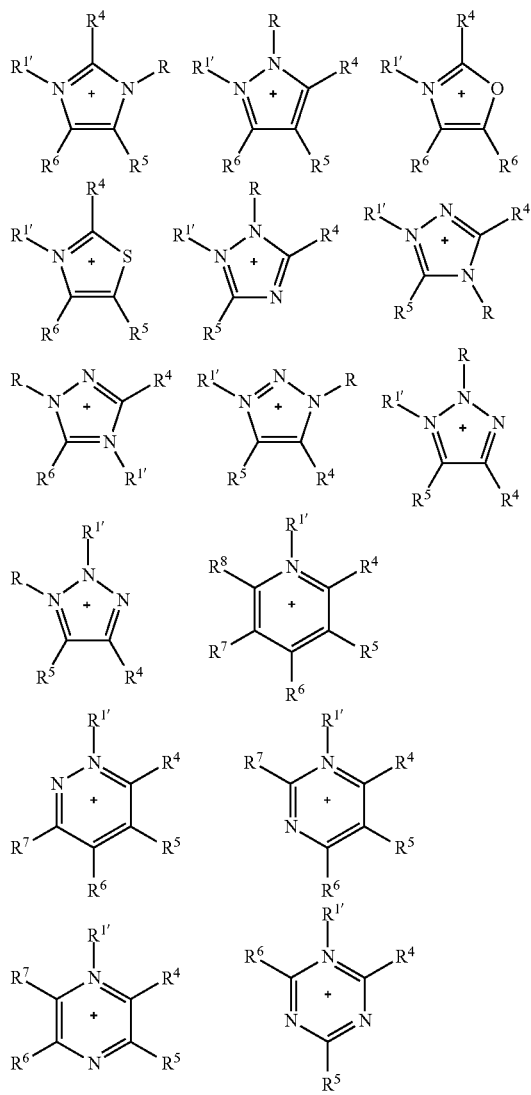

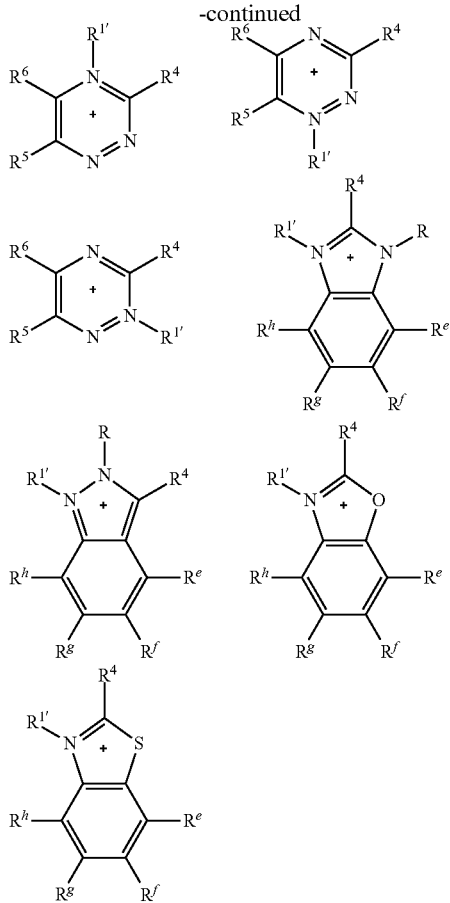

where

R is hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkynyl, aryl or heteroaryl, wherein the last 7 radicals mentioned can bear one or more halogen radicals and/or from 1 to 3 radicals selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, CO—$NR^cR^d$, where $R^c$ and $R^d$ are each hydrogen, $C_1$-$C_6$-alkyl, $C_1$-$C_6$-haloalkyl, cyclopentyl, cyclohexyl, phenyl, tolyl or benzyl;

R¹, R¹', R², R³ are each independently hydrogen, optionally substituted alkyl, alkenyl, alkynyl, cycloalkyl, cycloalkenyl, aryl or heteroaryl;

or two of R¹, R¹', R², R³ combine with the heteroatom to which they are attached to form a ring, wherein this ring is saturated or unsaturated, substituted or unsubstituted and wherein this chain can be interrupted by one or more heteroatoms selected from the group consisting of O, S, NH and N—$C_1$-$C_4$-alkyl;

R⁴, R⁵, R⁶, R⁷, R⁸ are each independently hydrogen, halogen, nitro, cyano, $OR^c$, $SR^c$, $NR^cR^d$, $COR^c$, $COOR^c$, CO—$NR^cR^d$, $C_1$-$C_{30}$-alkyl, $C_3$-$C_{12}$-cycloalkyl, $C_2$-$C_{30}$-alkenyl, $C_3$-$C_{12}$-cycloalkenyl, aryl or heteroaryl, wherein the last 6 radicals mentioned may bear one or more halogen radicals and/or from 1 to 3 radicals selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, CO—$NR^cR^d$, where $R^c$ and $R^d$ are each independently hydrogen, $C_1$-$C_6$-alkyl, $C_1$-$C_6$-haloalkyl, cyclopentyl, cyclohexyl, phenyl, tolyl or benzyl; or two of R, R⁴, R⁵, R⁶, R⁷, R⁸, which are adjacent, combine with the atom to which they are attached to form a ring, wherein this ring is unsaturated or aromatic, substituted or unsubstituted and wherein the chain formed by the radicals in question can be interrupted by one or more heteroatoms selected from the group consisting of O, S, N, NH and N—$C_1$-$C_4$-alkyl, $R^e$, $R^f$, $R^g$, $R^h$ are each independently hydrogen, $C_1$-$C_6$-alkyl, aryl, heteroaryl, $C_3$-$C_7$-cycloalkyl, halogen, $OR^c$, $SR^c$, $NR^cR^d$, $COOR^c$, CO—$NR^cR^d$ or $COR^c$, where $R^c$ and $R^d$ are each independently hydrogen, $C_1$-$C_6$-alkyl, $C_1$-$C_6$-haloalkyl, cyclopentyl, cyclohexyl, phenyl, tolyl or benzyl; preferably hydrogen, halogen or $C_1$-$C_6$-alkyl, more particularly hydrogen or $C_1$-$C_6$-alkyl;

$M^{+v}$ is selected from the elements of the transition metals, preferably selected from the elements Ce, Cs, Cr, Co, Cu, Dy, Er, Eu, Gd, Ho, Jr, Fe, Mn, Mo, Nd, Ni, Pt, Pu, Pr, Re, Rh, Rb, Ru, Sm, Ta, Tb, Tm, Ti, W, U, V, and Y, more preferably in the oxidation states $Ce^{+2}$, $Ce^{+3}$, $Ce^{+4}$, $Cs^{+1}$, $Cr^{+2}$, $Cr^{+3}$, $Cr^{+6}$, $Co^{+2}$, $Co^{+3}$, $Cu^{+1}$, $Cu^{+2}$, $Dy^{+3}$, $Er^{+2}$, $Eu^{+2}$, $Eu^{+3}$, $Gd^{+2}$, $Gd^{+3}$, $Ho^{+2}$, $Ho^{+3}$, $Ir^{+4}$, $Fe^{+2}$, $Fe^{+3}$, $Mn^{+2}$, $Mn^{+3}$, $Mo^{+2}$, $Mo^{+3}$, $Mo^{+4}$, $Mo^{+5}$, $Nd^{+2}$, $Nd^{+3}$, $Ni^{+2}$, $Ni^{+3}$, $Pt^{+4}$, $Pu^{+4}$, $Pu^{+6}$, $Pr^{+3}$, $Re^{+4}$, $Re^{+5}$, $Re^{+6}$, $Rh^{+2}$ $Rb^{+4}$, $Ru^{+3}$, $Ru^{+4}$, $Sm^{+2}$, $Sm^{+3}$, $Ta^{+5}$, $Tb^{+3}$, $Tm^{+3}$, $Ti^{+2}$, $Ti^{+3}$, $W^{+4}$, $W^{+5}$, $U^{+3}$, $U^{+4}$, $U^{+6}$, $V^{+2}$, $V^{+3}$, $V^{+4}$, $V^{+5}$, $Y^{+2}$ and $Y^{+3}$.

Each and every one of the v+1, v+2 and v+3 ions or ligands X is preferably selected independently of each other from fluoride, chloride, bromide, iodide, thiocyanate, hexafluorophosphate; hexafluoroarsenate; hexafluoroantimonate; trifluoroarsenate; nitrite; nitrate; sulfate; hydrogensulfate; carbonate; hydrogencarbonate; alkylcarbonate; arylcarbonate; phosphate; hydrogenphosphate; dihydrogenphosphate; tetrasubstituted borate of the general formula (Va) $[BR^iR^jR^kR^l]^-$, where $R^i$ to $R^l$ are each independently fluorine or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfonate of the general formula (Vb) $[R^m—SO_3]^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic sulfate of the general formula (Vc) $[R^m—OSO_3]^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

carboxylate of the general formula (Vd) $[R^n—COO]^-$, where $R^n$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

(fluoroalkyl)fluorophosphate of the general formula (Ve) $[PF_x(C_yF_{2y+1-z}H_z)_{6-x}]^-$, where $1 \le x \le 6$, $1 \le y \le 8$ and $0 \le z \le 2y+1$; or imide of the general formulae (Vf) $[R^o—SO_2—N—SO_2—R^p]^-$, (Vg) $[R^r—SO_2—N—CO—R^s]^-$ or (Vh) $[R^t—CO—N—CO—R^u]^-$, where $R^o$ to $R^u$ are each independently hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

organic phosphate of the general formula (Vi) $[R^m—OPO_4]^{2-}$ or (Vj) $[R^m—OPO_2—OR^n]^-$, where $R^m$ is a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen, and where $R^n$ is hydrogen or a carbon-containing organic, saturated or unsaturated, acyclic or cyclic, aliphatic, aromatic or araliphatic radical which has from 1 to 30 carbon atoms and can comprise one or more heteroatoms and/or be substituted by one or more functional groups or halogen;

when having the meaning of a carbon-containing organic, saturated or unsaturated, acyclic or cyclic, aliphatic, aromatic or araliphatic radical of from 1 to 30 carbon atoms, the radicals $R^i$ to $R^l$ in the tetra-substituted borate (Va), the radical $R^m$ in the organic sulfonate (Vb) and sulfate (Vc), the radical $R^n$ in the carboxylate (Vd) and the radicals $R^o$ to $R^u$ in the imides (Vf), (Vg) and (Vh) preferably are each independently $C_1$- to $C_{30}$-alkyl and their aryl-, heteroaryl-, cycloalkyl-, halogen-, hydroxyl-, amino-, carboxyl-, formyl-, —O—, —CO—, —CO—O— or —CO—N— substituted components, for example methyl, ethyl, 1-propyl, 2-propyl, 1-butyl, 2-butyl, 2-methyl-1-propyl(isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl(benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ where $n \le 30$, $0 \le a \le n$ and $b = 0$ or 1 (for example $CF_3$, $C_2F_5$, $CH_2CH_2—C_{(n-2)}F_{2(n-2)+1}$, $C_6F_{13}$, $C_8F_{17}$, $C_{10}F_{21}$, $C_{12}F_{25}$);

$C_3$- to $C_{12}$-cycloalkyl and their aryl-, heteroaryl-, cycloalkyl-, halogen-, hydroxyl-, amino-, carboxyl-, formyl-, —O—, —CO— or —CO—O-substituted components, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_{nF2(n-a)-(1-b)}H_{2a-b}$ where $n \le 30$, $0 \le a \le n$ and $b = 0$ or 1;

$C_2$- to $C_{30}$-alkenyl and their aryl-, heteroaryl-, cycloalkyl-, halogen-, hydroxyl-, amino-, carboxyl-, formyl-, —O—, —CO— or —CO—O-substituted components, for example 2-propenyl, 3-butenyl, cis-2-butenyl, trans-2-butenyl or $C_nF_{2(n-a)-(1-b)}H_{2a-b}$ where $n \le 30$, $0 \le a \le n$ and $b = 0$ or 1;

$C_3$- to $C_{12}$-cycloalkenyl and their aryl-, heteroaryl-, cycloalkyl-, halogen-, hydroxyl-, amino-, carboxyl-, formyl-, —O—, —CO— or —CO—O-substituted components, for example 3-cyclopentenyl, 2-cyclohexenyl, 3-cyclohexenyl, 2,5-cyclohexadienyl or $C_nF_{2(n-a)-3(1-b)}H_{2a-3b}$ where $n \le 30$, $0 \le a \le n$ and $b = 0$ or 1; and aryl or heteroaryl having from 2 to 30 carbon atoms and their alkyl-, aryl-, heteroaryl-, cycloalkyl-, halogen-, hydroxyl-, amino-, carboxyl-, formyl-, —O—, —CO— or —CO—O-substituted components, for example phenyl, 2-methylphenyl (2-tolyl), 3-methylphenyl(3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ where $0 \leq a \leq 5$.

When X comprises a tetra-substituted borate (Va) $[BR^iR^jR^kR^l]^-$, all the four radicals $R^i$ to $R^l$ are preferably identical therein, these radicals each preferably being fluorine, trifluoromethyl, pentafluoroethyl, phenyl, 3,5-bis(trifluoromethyl)phenyl. Particularly preferred tetra-substituted borates (Va) are tetrafluoroborate, tetraphenylborate and tetra[3,5-bis(trifluoromethyl)phenyl]borate.

When X comprises an organic sulfonate (Vb) $[R^m—SO_3]^-$ or sulfate (Vc) $[R^m—OSO_3]^-$, the radical $R^m$ is preferably methyl, trifluoromethyl, pentafluoroethyl, p-tolyl or $C_9F_{19}$. Particularly preferred organic sulfonates (Vb) are trifluoromethanesulfonate (triflate), methanesulfonate, nonadecafluorononanesulfonate (nonaflate) and p-toluenesulfonate; particularly preferred organic sulfates (Vc) are methylsulfate, ethylsulfate, n-propylsulfate, i-propylsulfate, butylsulfate, pentylsulfate, hexylsulfate, heptylsulfate, octylsulfate, nonylsulfate and decylsulfate and also longer-chained n-alkylsulfates; benzylsulfate, alkylarylsulfate.

When X comprises a carboxylate (Vd) $[R^n—COO]^-$, the radical $R^n$ is preferably hydrogen, trifluoromethyl, pentafluoroethyl, phenyl, hydroxyphenylmethyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl(isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred carboxylates (Vc) are formate, acetate, propionate, butyrate, valerate, benzoate, mandelate, trichloroacetate, dichloroacetate, chloroacetate, trifluoroacetate, difluoroacetate, fluoroacetate.

When X comprises a (fluoroalkyl)fluorophosphate (Ve) $[PF_x(C_yF_{2y+1-z}H_z)_{6-x}]^-$, z is preferably 0. Particular preference is given to (fluoroalkyl)fluorophosphates (Ve) where z=0, x=3 and $1 \leq y \leq 4$, specifically $[PF_3(CF_3)_3]^-$, $[PF_3(C_2F_5)_3]^-$, $[PF_3(C_3F_7)_3]^-$ and $[PF_3(C_4F_7)_3]^-$.

When X comprises an imide (Vf) $[R^o—SO_2—N—SO_2—R^p]^-$, (Vg) $[R^r—SO_2—N—Co—R^s]^-$ or (Vh) $[R^t—CO—N—CO—R^u]^-$, the radicals $R^o$ to $R^u$ are preferably each independently hydrogen, trifluoromethyl, pentafluoroethyl, phenyl, trichloromethyl, dichloromethyl, chloromethyl, trifluoromethyl, difluoromethyl, fluoromethyl or branched or unbranched $C_1$- to $C_{12}$-alkyl, for example methyl, ethyl, 1-propyl, 2-propyl, 1-butyl, 2-butyl, 2-methyl-1-propyl (isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Particularly preferred imides (Vf), (Vg) and (Vh) are $[F_3C—SO_2—N—SO_2—CF_3]^-$, $[F_3C—SO_2—N—CO—CF_3]^-$, $[F_3C—CO—N—CO—CF_3]^-$ and those in which the radicals $R^o$ to $R^u$ are each independently hydrogen, methyl, ethyl, propyl, butyl, phenyl, trichloromethyl, dichloromethyl, chloromethyl, trifluoromethyl, difluoromethyl or fluoromethyl.

Each X can also be independently selected from the following group of complex ligands:
acetylacetone; acyl; adenine; 2,2'-azobisisobutyronitrile; alanine; allyl; allyloxycarbonyl; water; aryl; arginine; asparagine; aspartate; BIABN; biotinyl; 2,2'-bis(diphenylphosphino)-6,6'-dimethoxy-1,1'-biphenyl; 2,2'-binaphthyldiphenyldiphosphine; 1,2-bis[4,5-dihydro-3H-binaphtho[1,2-c:2',1'-e]phosphepino]benzene; 1,1'-bis{4,5-dihydro-3H-dinaphtho[1,2-c:2',1'-e]phosphepino}ferrocene; 4,4'-di-tert-butyl-4,4',5,5'-tetrahydro-3,3'-bis-3H-dinaphtho[2,1-c:1',2'-e]phosphepine; BINAL; 4,5-dihydro-3H-dinaphtho[2,1-c:1',2'-e]phosphepine; 2,2'-binaphthyldiol; bis-tert-butyl-bipyridine; benzylmethylphenylphosphine; benzyl; tert-butoxycarbonyl; bis(2-((S)-4-isopropyl-4,5-dihydrooxazol-2-yl)phenyl)amine; bis(2-((S)-4-tert-butyl-4,5-dihydrooxazol-2-yl)phenyl)amine; 1,2-bis(2,5-diethylphospholano) ethane; butoxycarbonyl-4-diphenylphosphino-2-diphenylphosphinomethylpyrrolidine; 2,2'-bipyridine; benzoyl; benzyloxycarbonyl; CO; cycloheptatrienyl; citrulline; citrate; cyanide; cyclooctadiene; cyclooctatetraene; cyclopentadienyl; pentamethylcyclopentadienyl; cyclohexyl; cytidine; cysteine; cytosine; dibenzilideneacetone; O-isopropylidene-2,3-dihydroxy-1,4-bis(diphenylphosphino)butane; (1R,2R)-bis[(2-methoxyphenyl)phenylphosphino]ethane; 4-dimethylaminopyridine; dimethylglyoxime dipivaloylmethanate; Dess-Martin periodinane; 1,4,7,10-tetraazacyclododecane-1,4,7,10-tetraacetate; diphenylphosphenylethane; diphenylphosphenylmethane; diphenylphosphenylpropane; deoxyribose; diethylenetriamine pentaacetate; bis(2,5-dimethylphospholano)benzene; ethylenediaminetetraacetate; ethylenediamine; fluorenylmethoxycarbonyl; 7,7-dimethyl-1,1,1,2,2,3,3-heptafluoro octane-4,6-dionato; galactose; galactosamine; N-acetylgalactosamine, glycolyl; glucose; glucosamine, N-acetylglucosamine, glutamine, glutamate, glycine, guanine; guanosine; hemoglobin; hexafluoro acetylacetonate; histidine; hexamethylphosphoramide; hydroxyproline; isoleucine; leucine; lysine; 2,2'-bis[(N,N-dimethylamino)(phenyl)methyl]-1,1'-bisdicyclohexylphosphino) ferrocene; myoglobin; methionine; methemoglobin; metmyoglobin; 3,5-dioxa-4-phosphacyclohepta[2,1-a:3,4-a']dinaphthalen-4-yl)dimethyl-amine; methylphenyln-propylphosphine; methylsulfone; bicyclo[2.2.1]hepta-2,5-; neuramic acid; N-acetylneuramic acid; N-glycolylneuramic acid; 2,3-bis (diphenyl-phosphino)bicyclo[2.2.1]hept-5-ene; nitrilotriacetic acid; ornithine; succinate; oxalate; phenyl o-anisylmethylphosphine; phthalocyanine; phenylalanine; phenanthroline; picolylamine; piperidine; para-nitrobenzoic acid; porphyrin; proline; pyridyl; PYBOX; pyroglutamate; pyrazine; ribose; sarcosine; salene; serine; succinyl; 1,4,7-triazacyclononane; tert-butyldimethylsilyl; tartrate; terpyridine; thymidine; threonine; thymine; tetramethylethylenediamine; trimesic acid; tris(pyrazolyl)borate; triphenylphosphane; tryptophan; tyrosine; tetrazole; ubiquitine; uracil; uridine; valine.

wherein the paramagnetic ionic liquid described in b., with a transition metal cation, corresponds essentially to the paramagnetic salts described in c., provided these have a melting point of below 200° C., preferably of below 100° C. and more preferably of below 20° C., since otherwise the high melting point can only be compensated by dissolving as described in c.

These structural features are a necessary fundamental prerequisite for a paramagnetic behavior, i.e., an attracting interaction with an external magnetic field, but is not sufficient: transition metal compounds can but need not be paramagnetic, since the transition metal atom orbitals occupied by lone electrons can be fully occupied by complex ligand electrons for example, and so the paramagnetism disappears ("low-spin complexes").

In addition, these paramagnetic ionic liquids can be endowed with further functional groups and/or be admixed with additives in order to adapt the physical-chemical properties to the particular extraction problem.

The magnetic field can be introduced via a permanent magnet or an electromagnet, in which case superconducting electromagnets can also be used. The geometry of the introduced field can be used to precisely define the spatial conditions of the phase separation; and the strength of the field can be used to regulate the rate.

In the case of a liquid-liquid extraction, an extraction is even still possible when the density difference between the two phases is equal to zero. This also permits aerospace applications in zero gravity space.

In the case of a solid-liquid extraction, separation can likewise be achieved without use of a filtration even when the density is the same. In the case of a liquid-gas extraction, phase separation can be speeded and even aerosols can be separated off effectively.

The invention claimed is:

1. A process for extraction by means of an extracting medium, comprising the steps of:
    generating a magnetic extract of a component by contacting a feed with the extracting medium;
    the extracting medium being a paramagnetic ionic liquid which comprises magnetic ions in homogeneous phase; and
    separating the magnetic extract from the feed by an interaction between the extracting medium and a magnetic field, wherein the partition of phases occurs by the magnetic field,
    wherein the separating is not effected based on density differences of the phases.

2. The process as claimed in claim 1, wherein the extraction is a liquid-liquid or liquid-solid or liquid-gas extraction.

3. The process as claimed in claim 1, wherein the paramagnetic ionic liquid contains anions which are transition metal compounds.

4. The process as claimed in claim 1, wherein the paramagnetic ionic liquid contains cations which are transition metal cations and/or transition metal compounds.

5. The process as claimed in claim 4, wherein the paramagnetic ionic liquid conforms to one of the general formulae $[A]^+[M^{+v}X_{v+1}]^-$, $([A]^+)_2[M^{+v}X_{v+2}]^{2-}$ or $([A]^+)_3[M^{+v}X_{v+3}]^{3-}$ where $[A]^+$ is a quaternary ammonium cation $[R^{1'}R^1R^2R^3N]^+$;
a phosphonium cation $[R^{1'}R^1R^2R^3P]^+$, a sulfonium cation $[R^{1'}R^1R^2S]^+$ or a heteroaromatic cation;
wherein $M^{+v}$ is a transition metal atom having the oxidation number +v, v being an integer in the range 1-6;
wherein X is an ion or ligand having the charge number −1 and wherein $R^1$, $R^{1'}$, $R^2$, $R^3$ are each independently hydrogen, optionally substituted alkyl, alkenyl, aklynyl, cycloalkyl, cycloalkenyl, aryl or heteroaryl; or
two of $R^1$, $R^{1'}$, $R^2$, $R^3$ combine with a heteroatom to which they are attached to form a ring, wherein the ring is saturated or unsaturated, substituted or unsubstituted.

6. The process as claimed in claim 1, wherein the paramagnetic ionic liquid comprises a solution of a paramagnetic inorganic and/or organic salt in a nonparamagnetic ionic liquid.

7. The process as claimed in claim 6, wherein the nonparamagnetic ionic liquid conforms to the general formula $([A]^+)_a[B]^{a-}$;
where $[A]^+$ is a quaternary ammonium cation $[R^{1'}R^1R^2R^3N]^+$, a phosphonium cation $[R^{1'}R^1R^2R^3P]^+$, a sulfonium cation $[R^{1'}R^1R^2S]^+$ or a heteroaromatic cation, wherein $R^{1'}$, $R^1$, $R^2$, $R^3$ are each independently hydrogen, optionally substituted alkyl, alkenyl, aklynyl, cycloalkyl, cycloalkenyl, aryl or heteroaryl;
or two of $R^1$, $R^{1'}$, $R^2$, $R^3$ combine with the heteroatom to which they are attached to form a ring, wherein the ring is saturated or unsaturated, substituted or unsubstituted, and
wherein $[B]^{a-}$ is an anion with a being one of 1, 2, and 3.

8. The process as claimed in claim 6, wherein the paramagnetic salt has a melting point of below 200° C.

9. The process as claimed in claim 1, wherein the paramagnetic ionic liquid comprises a solution of a paramagnetic inorganic and/or paramagnetic organic salt in an ionic liquid; and
wherein the paramagnetic ionic liquid has a melting point of below 200° C.

10. The process as claimed in claim 1, wherein the paramagnetic ionic liquid is admixed with further functional groups and/or with additives.

* * * * *